(12) United States Patent
Ichikawa (10) Patent No.: US 9,190,072 B2
(45) Date of Patent: Nov. 17, 2015

(54) LOCAL PEAK WEIGHTED-MINIMUM MEAN SQUARE ERROR (LPW-MMSE) ESTIMATION FOR ROBUST SPEECH

(71) Applicant: International Business Machines Corporation, Armonk, NY (US)

(72) Inventor: Osamu Ichikawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 13/786,603

(22) Filed: Mar. 6, 2013

(65) Prior Publication Data

US 2013/0238324 A1 Sep. 12, 2013

(30) Foreign Application Priority Data

Mar. 7, 2012 (JP) ................................. 2012-050603

(51) Int. Cl.
*G10L 21/0208* (2013.01)
*G10L 15/20* (2006.01)

(52) U.S. Cl.
CPC ............. *G10L 21/0208* (2013.01); *G10L 15/20* (2013.01)

(58) Field of Classification Search
CPC .......................... G10L 21/0208; G10L 15/20
USPC ......................................................... 704/226
See application file for complete search history.

(56) References Cited

U.S. PATENT DOCUMENTS

| | | | |
|---|---|---|---|
| 5,960,391 A * | 9/1999 | Tateishi et al. | 704/232 |
| 2004/0052383 A1 | 3/2004 | Acero et al. | |
| 2012/0185243 A1* | 7/2012 | Fukuda et al. | 704/205 |

FOREIGN PATENT DOCUMENTS

| | | |
|---|---|---|
| CN | 101452701 | 6/2009 |
| JP | 2008298844 | 12/2008 |

OTHER PUBLICATIONS

Machine translation for JP 2008-298844, IDS.*
Ichikawa, Osamu, et al. "DOA Estimation with Local-Peak-Weighted CSP". EURASIP Journal on Advances in Signal Processing, Aug. 1, 2009, pp. 1-8.
Ichikawa, Osamu, et al. "Local Peak Enhancement Combined with Noise Reduction Algorithms for Robust Automatic Speech Recognition in Automobiles", pp. 1-4.
Moreno, Pedro J., et al. "A Vector Taylor Series Approach for Environment-Independent Speech Recognition", pp. 1-4.

(Continued)

*Primary Examiner* — Qian Yang
(74) *Attorney, Agent, or Firm* — Jennifer R. Davis; Anne Vachon Dougherty (57) ABSTRACT

A system and method for noise reduction applied to a speech recognition front-end. An output of a front-end is optimized by giving, as a weight to the output for each band, a confidence index representing the remarkableness of the harmonic structure of observation speech. In a first method, when clean speech is estimated by executing MMSE estimation on a model that gives a probability distribution of noise-removed speech generated from observation speech, the posterior probability of the MMSE estimation is weighted using the confidence index as a weight. In a second method, linear interpolation is executed, for each band, between an observed value of observation speech and an estimated value of clean speech, with the confidence index serving as a weight. The first method and the second method can be combined.

4 Claims, 10 Drawing Sheets

(56) References Cited

OTHER PUBLICATIONS

Rennie, Steven, J. et al. "Single-Channel Multitalker Speech Recognition", IEEE Signal Processing Magazine, pp. 66-80, Nov. 2011.

Segura, J.C., et al, "Model-based compensation of the additive noise for continuous speech recognition. Experiments using the AURORA II database and tasks", Eurospeech 2001, pp. 1-4.

Fukada, Takashi, et al. "Improved Voice Activity Detection Using Static Harmonic Features,", IEEE ICASSP 2010, pp. 4482-4485, Jun. 2010.

Moreno, Pedro J., et al. "A Vector Taylor Series Approach for Environment-Independent Speech Recognition". pp. 1-5.

Rennie, Steven J., et al. "Single-Channel Multitalker Speech Recognition", IEEE Signal Processing Magazine, pp. 66-80, Nov. 2011.

Segura, J.C., et al. "Model-based compensation of the additive noise for continuous speech recognition. Experiments using the AURORA II database and tasks", Eurospeech 2001, pp. 1-4.

Fukada, Takashi, et al. "Improved Voice Activity Detection Using Static Harmonic Features", IEEE, ICASSP 2010, Jun. 2010, pp. 1-4.

* cited by examiner

LOCAL PEAK WEIGHTED-MINIMUM MEAN SQUARE ERROR (LPW-MMSE) ESTIMATION FOR ROBUST SPEECH

FIELD OF THE INVENTION

The present invention relates to speech recognition technology, and more specifically, it relates to noise reduction technology.

BACKGROUND OF THE INVENTION

In speech recognition technology, removal of effects of background noise is a matter of concern that is important in improving the accuracy of utterance recognition. Filtering techniques of the related art (such as a spectral subtraction method and Wiener filtering) have a measure of success when background noise is relatively small, but fail to achieve desired results over large background noise since targeted speech is drowned out by the noise.

To this end, attention has been paid in recent years to approaches that use a probability model of clean speech (utterance speech on which no noise whatsoever is superimposed). These model-based noise reduction methods have been reported to show high performance even over loud background noise. In this regard, Japanese Patent Application Publication No. 2008-298844 discloses a speech recognition system adopting model-based noise reduction.

SUMMARY OF INVENTION

An object of the present invention is to provide a novel technique of noise reduction applied to a speech recognition front-end.

The inventors have diligently examined a noise reduction method applied to a speech recognition front-end, and as a result, conceived a configuration in which a confidence index representing the remarkableness of the harmonic structure of observation speech is given as a weight to an output for each band, thereby accomplishing the present invention.

That is, according to the present invention, there is provided a first method, which is a noise reduction method, including: the step of generating a confidence index for each band on the basis of a spectrum of observation speech; and the step of estimating a clean speech estimated value by executing MMSE estimation on a probability model of clean speech generated on the basis of the observation speech, and, for each band, weighting posterior probability of the MMSE estimation using the confidence index as a weight.

Also, according to the present invention, there is provided a second method, which is a noise reduction method, including: the step of generating a confidence index for each band on the basis of a spectrum of observation speech; the step of estimating a clean speech estimated value from the observation speech; and the step of deriving an output value by executing, for each band, linear interpolation between an observed value of the observation speech and the clean speech estimated value, with the confidence index serving as a weight.

Further, according to the present invention, there is provided a third method combining the first method and the second method described above, a computer program product for causing a computer to execute each of the methods, and a noise reduction apparatus implementing functions for realizing each of the methods.

As described above, according to the present invention, the output of the front-end is optimized by giving, as a weight, the confidence index representing the remarkableness of the harmonic structure of observation speech to the output for each band.

DETAILED DESCRIPTION OF THE INVENTION

Hereinafter, the present invention will be described with reference to embodiments illustrated in the drawings. However, the present invention is not limited to the embodiments illustrated in the drawings. Note that, in the drawings to be referred to below, common elements are given the same reference numerals, and descriptions thereof are appropriately omitted.

In general, a speech recognition system includes a front-end that applies certain conversion to an acoustic signal of uttered speech to extract a feature amount, and a back-end that searches a database on the basis of the feature amount, which is extracted in the front-end, to specify the contents of the utterance. The present invention is an improvement of noise reduction that has been applied so far to the front-end and aims to optimize the output of the front-end by utilizing confidence for each band of observation speech.

Hereinafter, the present invention will be described on the basis of three embodiments. A first embodiment discloses a technique of improving the estimation of an MMSE (Minimum Mean Square error) used in model-based noise compensation. A second embodiment discloses a technique of optimizing an output value by implementing linear interpolation between an estimated value of clean speech and an observed value. Further, a third embodiment discloses a technique combining the above-described two techniques.

Model-Based Noise Compensation

Before starting the description of the embodiments of the present invention, model-based noise compensation applied to the front-end will be described on the basis of FIG. 1. Note that, in the following description, "observation speech" refers to the actual observed sound in which background noise is superimposed on utterance speech; "clean speech" refers to utterance speech on which no noise whatsoever is superimposed; and a "clean speech estimated value" refers to an estimated value of clean speech estimated from the observation speech. Also, a "frequency spectrum" refers to a power spectrum or an amplitude spectrum.

Model-based noise compensation is, in short, technology of modeling clean speech x as a probability distribution p(x|y) of x when an observed value y is given, and estimating an estimated value of the clean speech x from the probability model p(x|y). MMSE estimation is elemental technology used in estimation at a subsequent stage.

Figure 1:
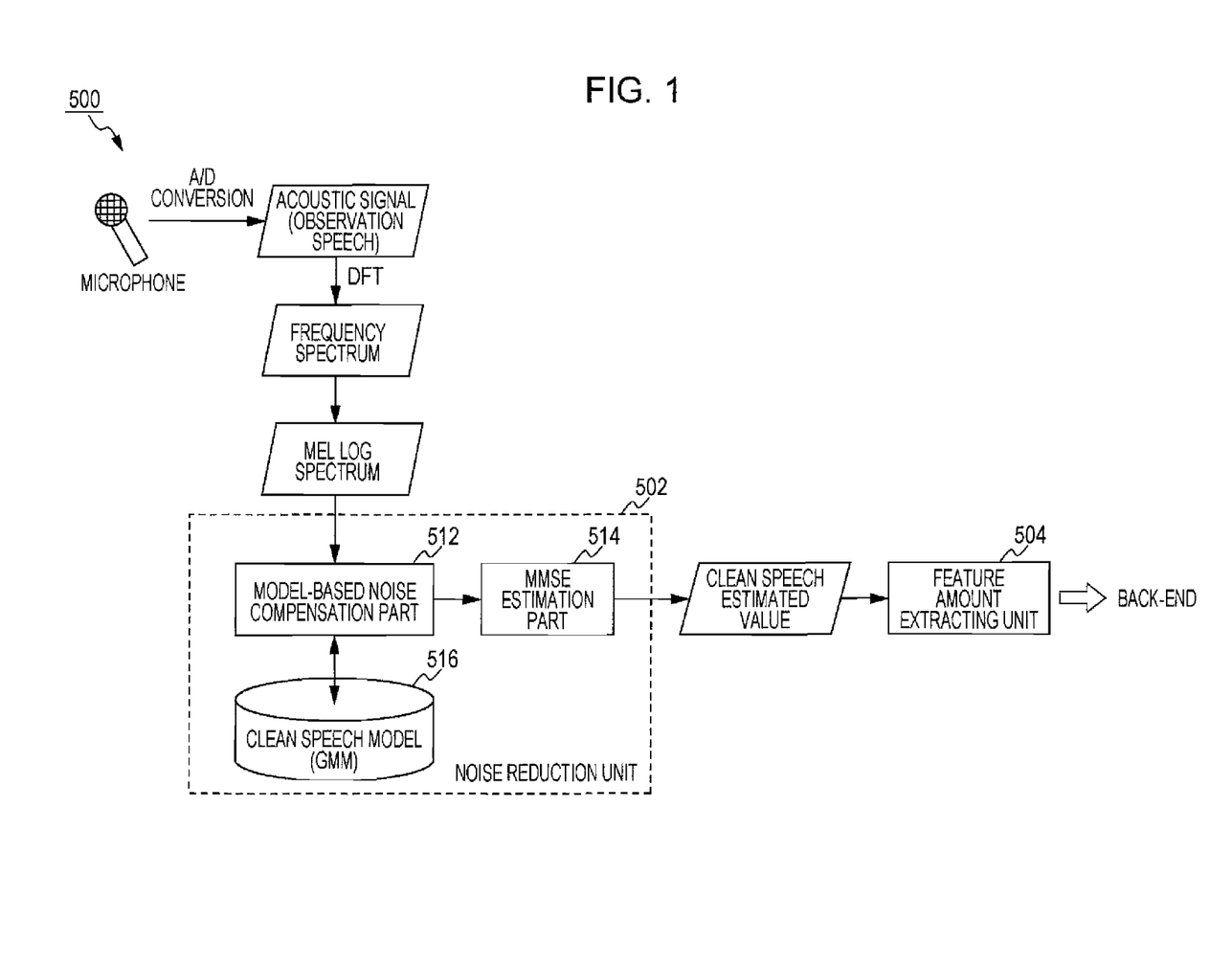
FIG. 1 is a conceptual diagram illustrating the configuration of a front-end in a speech recognition system of the related art.

FIG. 1 conceptually illustrates the configuration of a front-end 500 in a speech recognition system of the related art to which model-based noise compensation is applied.

Observation speech collected and recorded with a microphone is converted by an A/D converter to a digital signal (acoustic signal). Thereafter, the digital signal is subjected to framing and discrete Fourier transform (DFT) using an appropriate window function, which is then converted to a frequency spectrum for each frame. Next, the frequency spectrum is subjected to a mel filter bank (a filter bank in which band-pass filters are arranged at equal intervals on the mel scale), and the logs thereof are taken, which are then converted to a mel log spectrum and input to a noise reduction unit 502.

The noise reduction unit 502 includes a model-based noise compensation part 512, an MMSE estimation part 514, and a database 516 that stores a Gaussian mixture model (hereinafter referred to as a GMM) of clean speech. On the basis of the input mel log spectrum, the noise reduction unit 502 generates a clean speech estimated value for each frame, and outputs the clean speech estimated value to a feature amount extracting unit 504.

The model-based noise compensation part 512 is a function part that represents clean speech included in observation speech as a probability distribution, and is implemented by an existing modeling algorithm, such as VTS, SPLICE, DNA, or Segura. The model-based noise compensation part 512 executes a certain arithmetic operation by using the mel log spectrum for each frame, which is input to the noise reduction unit 502, and the clean speech model (GMM) stored in the database 516, and outputs the clean speech included in the observation speech as a mixture multi-dimensional normal distribution with a dimension for each band.

The MMSE estimation part 514 executes MMSE estimation based on the probability distribution output from the model-based noise compensation part 512, and generates a clean speech estimated value. Note that the clean speech model stored in the database 516 is a GMM in the mel log spectrum domain, which is generated for each phoneme on the basis of prior leaning. The model-based noise compensation part 512 outputs clean speech as a GMM in the mel log spectrum domain. The MMSE estimation part 514 generates a clean speech estimated value as a vector in the mel log spectrum domain.

The feature amount extracting unit 504 extracts a certain feature amount such as a mel frequency cepstrum coefficient (MFCC) from the clean speech estimated value output from the MMSE estimation part 514, and sends the feature amount to the back-end. In the back-end, the contents of the utterance are specified on the basis of the feature amount received from the front-end, by using an existing configuration such as an HMM, an acoustic model, or an N-gram language model.

The configuration of the front-end in the speech recognition system of the related art has been briefly described above. Next, the existing MMSE estimation will be described in detail. Model-based noise compensation algorithms of the related art include a first method of directly estimating a clean speech estimated value from observation speech, which has been described above, and a second method of estimating a compensation amount from observation speech and deriving a clean speech estimated value from the difference between the observation speech and an estimated value of the compensation amount. In the second method, MMSE estimation is used in estimating a compensation amount. The following description will be based on the second method, which is adopted by Segura, in order to simplify the description.

Existing MMSE Estimation

An observed value $y_d(t)$ in the mel log spectrum domain of a band d (frequency band on the mel-scale) in a frame t of observation speech y can be expressed as a function of a clean speech value $x_d(t)$ and a noise value $n_d(t)$ in equation (1) below:

[Eq. 1]

$$y_d(t)=x_d(t)+\log(1+\exp(n_d(t)-x_d(t))) \quad (1)$$

When t is omitted from equation (1) above and equation (1) is represented as a vector, equation (2) below is obtained:

[Eq. 2]

$$y=x+g \quad (2)$$

A mismatch vector g for each band d is given by a mismatch function G indicated in equation (3) below:

[Eq. 3]

$$g_d=G_d(x,n)=\log(1+\exp(n_d-x_d)) \quad (3)$$

Here, clean speech x is modeled as a K-mixture GMM indicated in equation (4) below:

[Eq. 4]

$$p(x) = \sum_{k}^{K} \gamma_k \cdot N(x; \mu_{x,k}, \Sigma_{x,k}) \quad (4)$$

In equation (4) above, $\gamma_k$, $\mu_{x,k}$, and $\Sigma_{x,k}$ indicate a prior probability, a mean vector, and a covariance matrix, respectively, of a k-th normal distribution.

By using the linear Taylor expansion on the basis of equations (1) to (4) above, the mismatch vector g is modeled as a K-mixture GMM indicated in equation (5) below:

[Eq. 5]

$$p(g) = \sum_{k}^{K} \gamma_k \cdot N(g; \mu_{g,k}, \Sigma_{g,k}) \quad (5)$$

Note that the mean vector $\mu_{g,k}$ in equation (5) above is represented as equation (6) below, and the covariance matrix $\Sigma_{g,k}$ is represented as equation (7) below:

[Eq. 6 and 7]

$$\mu_{g,k} \cong \log(1+\exp(\mu_n-\mu_{x,k}))=G(\mu_{x,k},\mu_n) \quad (6)$$

$$\Sigma_{g,k} \cong F(\mu_{x,k},\mu_n)^2 \cdot (\Sigma_{x,k}+\Sigma_n) \quad (7)$$

An auxiliary function F in equation (7) above is defined as equation (8) below:

[Eq. 8]

$$F_d(x,n)=(1+\exp(x_d-n_d))^{-1} \quad (8)$$

As a result, the clean speech estimated value x^ is given by equation (9-1) below:

[Eq. 9-1]

$$\hat{x} = y - \int g \cdot p(g \mid y) dg \cong y - \sum_{k}^{K} \rho_k(y) \cdot \mu_{g,k} \qquad (9\text{-}1)$$

In contrast, in the first method of directly estimating the clean speech estimated value x^ from the observation speech y, the clean speech estimated value x^ is given by equation (9-2) below instead of equation (9-1) above:

[Eq. 9-2]

$$\hat{x} = \int x \cdot p(x \mid y) dx \cong \sum_{k}^{K} \rho_k(y) \cdot \mu_{x,k} \qquad (9\text{-}2)$$

Here, posterior probabilities $\rho_k$ in equations (9-1) and (9-2) above are both given by equation (10) below:

[Eq. 10]

$$\rho_k(y) = \gamma_k \cdot N(y; \mu_{y,k}, \Sigma_{y,k}) \Big/ \sum_{k'} \gamma_{k'} \cdot N(y; \mu_{y,k'}, \Sigma_{y,k'}) \qquad (10)$$

The mean vector $\mu_{y,k}$ in equation (10) above is represented by equation (11) below, and the covariance matrix $\Sigma_{y,k}$ is represented by equation (12) below:

[Eq. 11 and 12]

$$\mu_{y,k} \cong \mu_{x,k} + G(\mu_{x,k}, \mu_n) \qquad (11)$$

$$\Sigma_{y,k} \cong \{1 - F(\mu_{x,k}, \mu_n)^2\} \cdot \Sigma_{x,k} + F(\mu_{x,k}, \mu_n)^2 \cdot \Sigma_n \qquad (12)$$

Note that, in equations (11) and (12) above, speech model parameters $[\mu_{x,k}, \Sigma_{x,k}]$ are given by prior learning data, and noise model parameters $[\mu_n, \Sigma_n]$ are set by the model-based noise compensation part 512 on the basis of an observed value in a non-speech segment and given to the MMSE estimation part 514.

As has been described above, MMSE estimation is, in short, a process of approximating the clean speech estimated value x^ as the sum of mean vectors $\mu_{x,k}$ of k probability distributions weighted using the posterior probability $\rho_k(y)$ as a weight. The first embodiment of the present invention pays attention to this point and optimizes the output of the front-end by appropriately modifying the posterior probability in MMSE estimation.

CW-MMSE

In this section, a technique of weighting the posterior probability in MMSE estimation by using a confidence index as a weight will be described. In the following description, this technique is referred to as CW-MMSE (Confidence Weighted MMSE).

In existing MMSE, the clean speech estimated value x^ is given by equation (9-1) or (9-2) below, and the posterior probability $\rho_k(y)$ in each equation is given by equation (10) below, as has been described above.

$$\hat{x} = y - \int g \cdot p(g \mid y) dg \cong y - \sum_{k}^{K} \rho_k(y) \cdot \mu_{g,k} \qquad (9\text{-}1)$$

$$\hat{x} = \int x \cdot p(x \mid y) dx \cong \sum_{k}^{K} \rho_k(y) \cdot \mu_{x,k} \qquad (9\text{-}2)$$

$$\rho_k(y) = \gamma_k \cdot N(y; \mu_{y,k}, \Sigma_{y,k}) \Big/ \sum_{k'} \gamma_{k'} \cdot N(y; \mu_{y,k'}, \Sigma_{y,k'}) \qquad (9\text{-}3)$$

Here, CW-MMSE uses, in equation (9-1) or (9-2) above, which gives the clean speech estimated value x^ a posterior probability $\rho'_k(y)$ weighted using a confidence index $\alpha_d$, instead of the posterior probability $\rho_k(y)$, as a weight. Equation (13) below indicates the posterior probability $\rho'_k(y)$ used by CW-MMSE:

[Eq. 13]

$$\rho'_k(y) = \gamma_k \cdot N'(y; \mu_{y,k}, \Sigma_{y,k}) \Big/ \sum_{k'} \gamma_{k'} \cdot N'(y; \mu_{y,k'}, \Sigma_{y,k'}) \qquad (13)$$

Here, the normal distribution in equation (13) above is given by equation (14) below, which uses a diagonal covariance assumption. Note that, in equation (14) below, D indicates the number of dimensions of the normal distribution:

[Eq. 14]

$$N'(y; \mu_{y,k}, \Sigma_{y,k}) = \Pi_{d=1}^{D} \{(2\pi)^{-1/2} \cdot |\Sigma_{y,k,d}|^{-1/2} \cdot \exp(-(y_d - \mu_{y,k,d})^2 / 2\Sigma_{y,k,d})\}^{\alpha_d} \qquad (14)$$

With reference to equation (14) above, it can be understood that a normal distribution N', which is a term in an equation for calculating the posterior probability $\rho'_k(y)$, is multiplied by an index using the confidence index $\alpha_d$ as a weight. Here, the confidence index is an index that represents the confidence of a band. In general, the confidence of a band is evaluated from the viewpoint of signal deterioration caused by background noise. In the present invention, the confidence index is defined as follows.

Confidence Index

It is known that the frequency spectrum of vowels included in human utterance has a harmonic structure. In an environment with no background noise, the harmonic structure of vowels is maintained in the entire band of the frequency spectrum of observation speech. In contrast, over broadband noise such as a vehicle's driving sound or air conditioning sound, the harmonic structure of vowels is lost in many bands, and the harmonic structure is maintained only in a band such as a formant where the speech power is concentrated.

From this point, the present invention assumes that deterioration caused by background noise occurs infrequently in a band with a remarkable harmonic structure, and defines the remarkableness of the harmonic structure as a confidence index for that band. Hereinafter, a method of generating a confidence index of the present invention will be described.

A confidence index of the present invention is generated using an LPW (Local Peak Weight). Here, an LPW is such that a great change such as that including formant information is removed from the spectral energy distribution of observation speech, only regular peaks and troughs corresponding to the harmonic structure are extracted, and their values are normalized. In the present invention, an LPW is generated for each frame by performing the following procedure.

Figure 2:
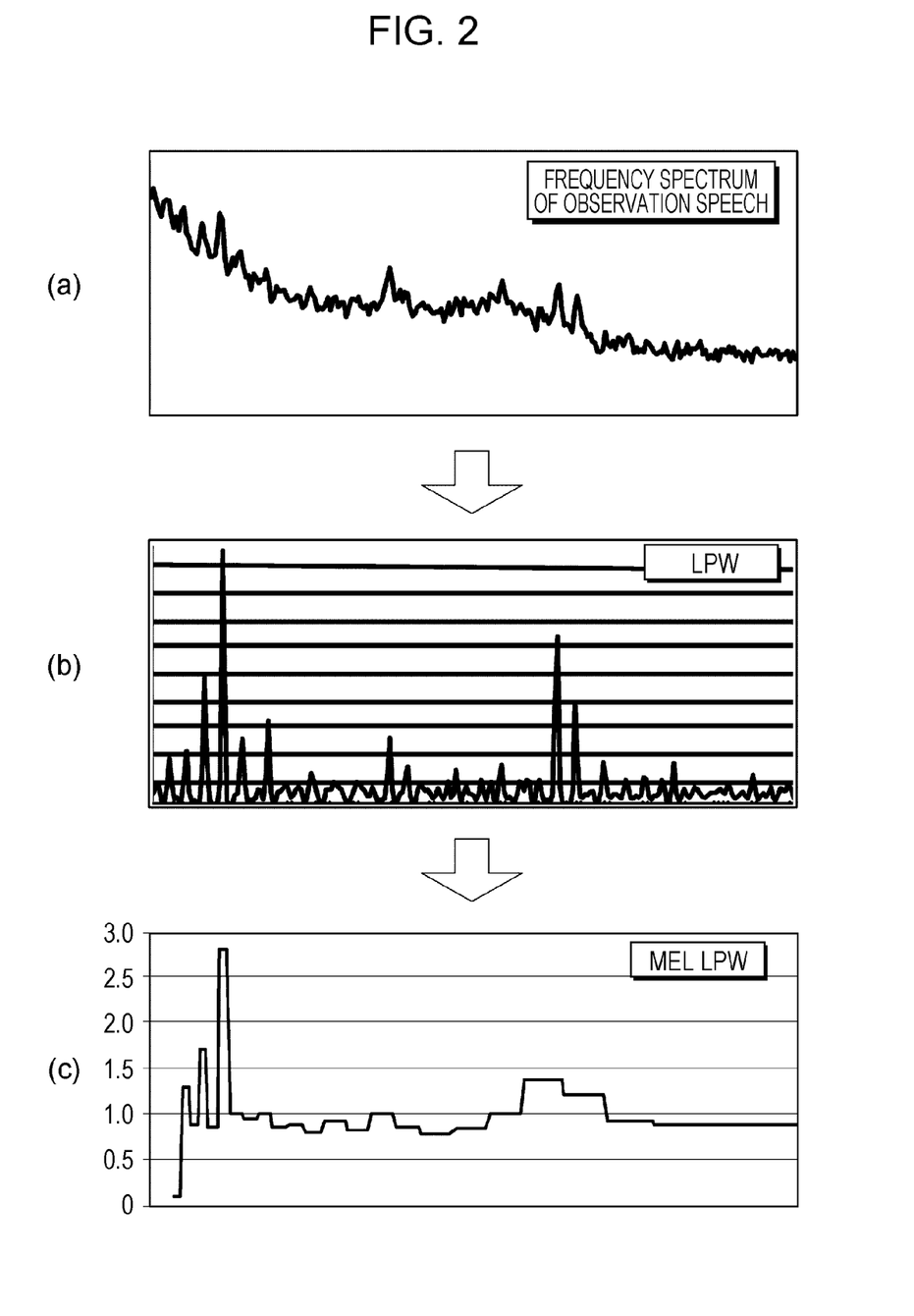
FIG. 2 includes conceptual diagrams illustrating the steps of generating a mel LPW from the frequency spectrum of observation speech.

Firstly, the logarithm of the frequency spectrum of a frame t of observation speech is taken, and its log spectrum is subjected to discrete cosine transform to obtain a cepstrum. Next, among terms of the obtained cepstrum, only terms in a domain(s) corresponding to the harmonic structure of LPW vowels are left, and the other terms are cut. Thereafter, the processed cepstrum is subjected to inverse discrete cosine transform to convert the cepstrum back to the log spectrum domain, which is further converted back to the frequency spectrum domain. Finally, the converted frequency spectrum is normalized so that the mean of the frequency spectrum becomes 1, thereby obtaining an LPW. FIG. 2(a) illustrates the frequency spectrum of a frame t of observation speech. FIG. 2(b) illustrates an LPW generated on the basis of the frequency spectrum illustrated in FIG. 2(a).

Next, a mel LPW illustrated in FIG. 2(c) is obtained by smoothing the LPW illustrated in FIG. 2(b) on the mel scale. Specifically, values are smoothed by subjecting the LPW to a mel filter bank (a filter bank in which band-pass filters are arranged at equal intervals on the mel scale), and one value is obtained for each mel band. As illustrated in FIG. 2(c), the mel LPW value is given in each mel band. The magnitude of the mel LPW value corresponds to the remarkableness of the harmonic structure of a frequency spectrum band at high resolution, which corresponds to each mel band.

In the present invention, the mel LPW value that is normalized by an appropriate method is used as a confidence index. In the case of CW-MMSE, the confidence index $\alpha_d$ in equation (14) above can be generated by the following procedure.

Figure 3:
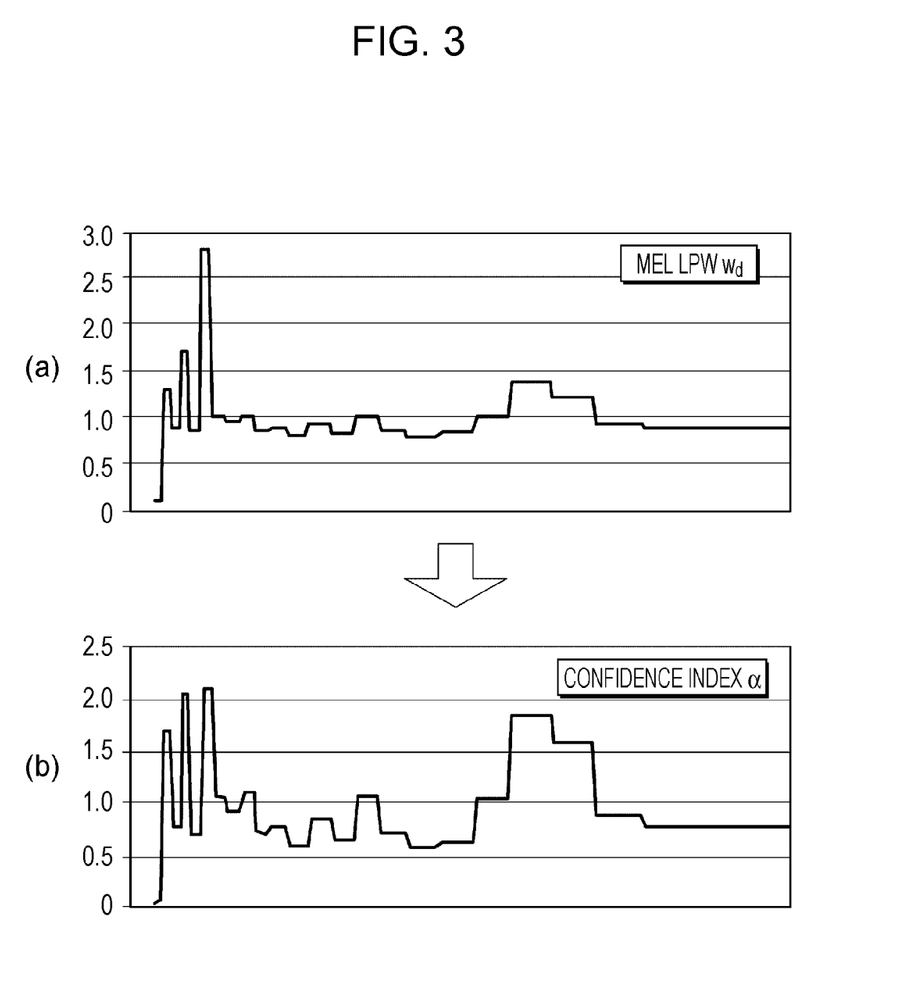
FIG. 3 includes conceptual diagrams illustrating the step of generating a confidence index α from a mel LPW.

Firstly, in order that the confidence index $\alpha_d$ does not take an extreme value, the dynamic range of a mel LPW illustrated in FIG. 3(a) is compressed by using an appropriate scaling function. As a result, the mel LPW value $w_d$ of each band is converted to $\alpha'_d$. An example of the scaling function includes a sigmoid function. Equation (15) below indicates an equation for converting the mel LPW value $w_d$ to $\alpha'_d$ by using a sigmoid function:

[Eq. 15]

$$\alpha'_d = 1.0/(1.0 + \exp(-a \cdot (w_d - 1.0))) \quad (15)$$

Note that, in equation (15) above, a is a tuning parameter, and an appropriate constant value is set.

Next, the compressed value $\alpha'_d$ is normalized so that the mean becomes 1. Normalization such that the mean becomes 1 is done because the confidence index $\alpha_d$ is used as an index weight in equation (14) above. Equation (16) below indicates an equation for normalizing $\alpha'_d$ and obtaining the confidence index $\alpha_d$:

[Eq. 16]

$$\alpha_d = \alpha'_d \bigg/ \left( \frac{1}{D} \sum_{d'} \alpha'_{d'} \right) \quad (16)$$

FIG. 3(b) illustrates the confidence index $\alpha_d$ generated by the above-described procedure. As illustrated in FIG. 3(b), the confidence index $\alpha_d$ is given in each mel band.

In the case of a voiceless section or an unvoiced section, the confidence index $\alpha_d$ of a band d in a frame t will uniformly approach 1. In this case, the normal distribution N' in equation (14) above becomes a general normal distribution. Thus, the posterior probability $\rho'_k(y)$ is not weighted.

When there is a spectral band where the harmonic structure of vowels is remarkable in a frame t of a voiced section, the confidence index $\alpha_d$ of a corresponding band d will become greater than 1. As a result, regarding the band d, the normal distribution N' in equation (14) above becomes great, and the posterior probability $\rho'_k(y)$ of the band d becomes great. This means that, in MMSE estimation executed by CW-MMSE, the contribution of a mel band corresponding to the spectral band where the harmonic structure of vowels is remarkable becomes great.

In contrast, when there is a spectral band where the harmonic structure of vowels is lost in the frame t of the voiced section, the confidence index $\alpha_d$ of the corresponding band d will become smaller than 1. As a result, regarding the band d, the normal distribution N' in equation (14) above becomes small, and the posterior probability $\rho'_k(y)$ of the band d becomes small. This means that, in MMSE estimation executed by CW-MMSE, the contribution of a mel band corresponding to the spectral band where the harmonic structure of vowels is lost becomes small.

Figure 4:
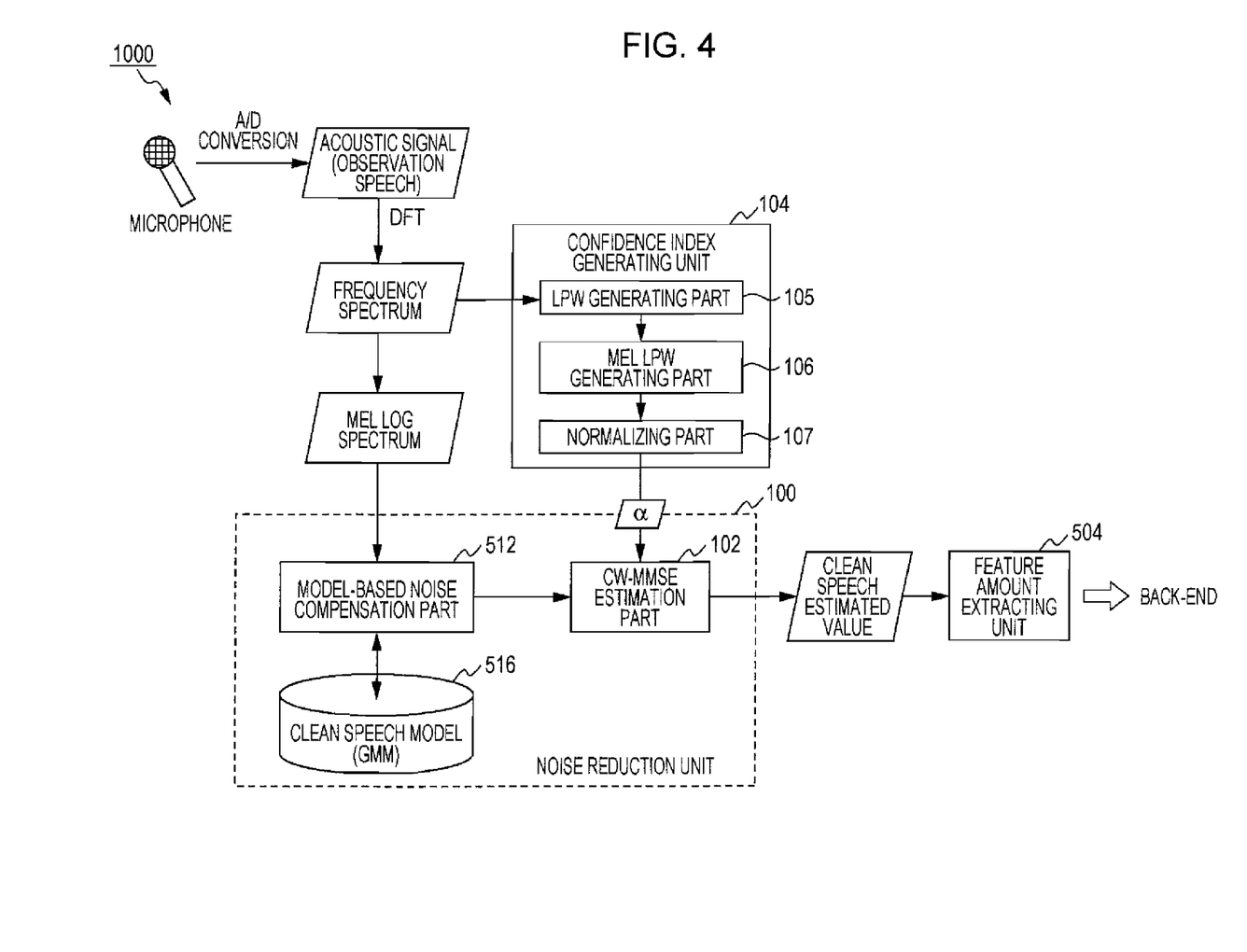
FIG. 4 is a conceptual diagram illustrating the configuration of a front-end in a speech recognition system of a first embodiment.

FIG. 4 conceptually illustrates the configuration of a front-end 1000 in the speech recognition system according to the first embodiment. A noise reduction unit 100 of the front-end 1000 includes a CW-MMSE estimation part 102 implementing CW-MMSE instead of existing MMSE. The front-end 1000 further includes a confidence index generating unit 104. The confidence index generating unit 104 includes an LPW generating part 105, a mel LPW generating part 106, and a normalizing part 107. Hereinafter, a process executed by the front-end 1000 will be described on the basis of a flowchart illustrated in FIG. 5. Note that, in the following description, reference will be appropriately made to FIG. 4.

Figure 5:
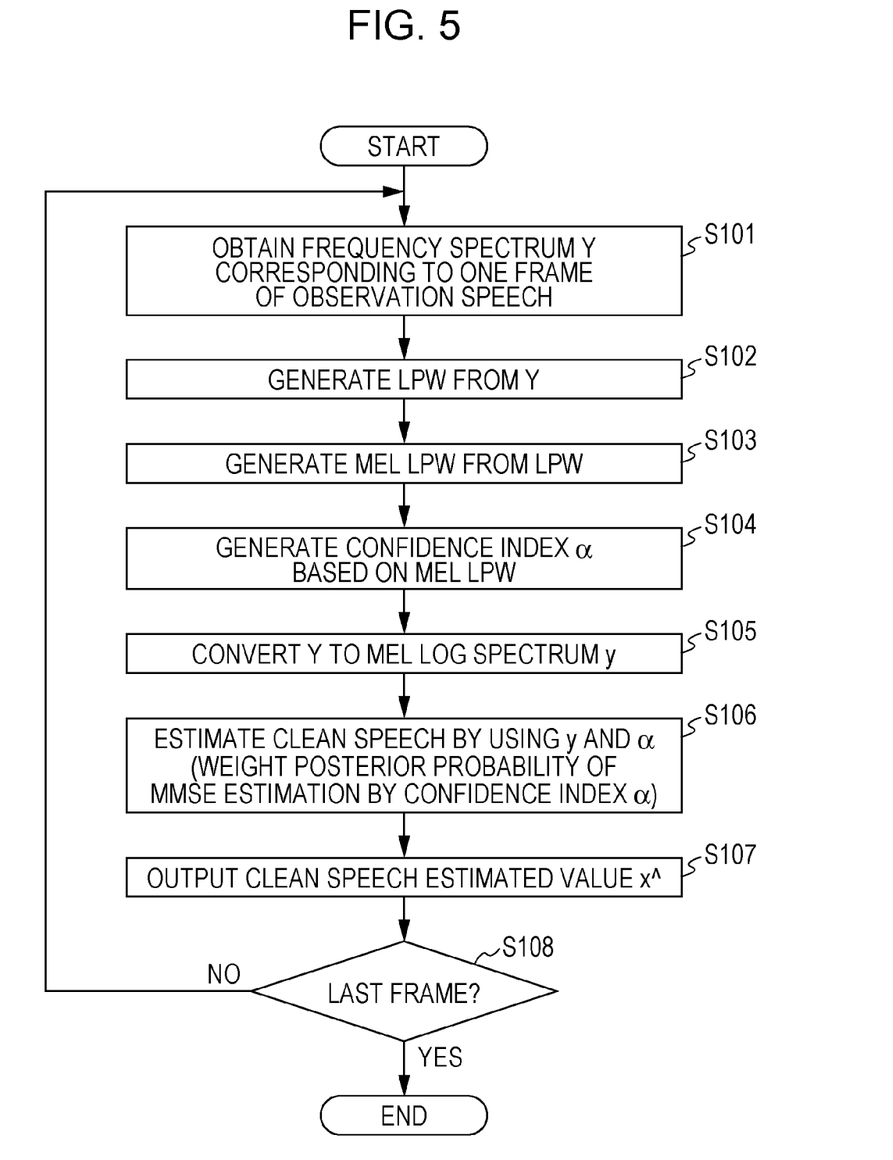
FIG. 5 is a flowchart illustrating a process executed by the front-end of the first embodiment.

Firstly, when the frequency spectrum Y corresponding to one frame of observation speech is obtained (step S101), the LPW generating part 105 extracts the harmonic structure of the frequency spectrum Y and generates an LPW (step S102). Next, the mel LPW generating part 106 generates a mel LPW from the LPW (step S103). The normalizing part 107 normalizes the mel LPW with an appropriate method, and generates a confidence index $\alpha$ (the mean of values is 1) for each band (step S104). The confidence index generating unit 104 provides the generated confidence index $\alpha$ to the CW-MMSE estimation part 102 of the noise reduction unit 100.

Thereafter, the frequency spectrum Y corresponding to one frame is converted to a mel log spectrum y (step S105) and is input to the noise reduction unit 100. The noise reduction unit 100 estimates clean speech by using the input mel log spectrum y and the confidence index $\alpha$ provided from the confidence index generating unit 104. At this time, the CW-MMSE estimation part 102 weights the posterior probability of MMSE estimation using the confidence index $\alpha$ as a weight (step S106).

The noise reduction unit 100 outputs a clean speech estimated value x^ estimated by the CW-MMSE estimation part 102 to the feature amount extracting unit 504 (step S107). The feature amount extracting unit 504 extracts a certain feature amount from the clean speech estimated value x^ and sends the feature amount to the back-end. The above-described series of procedures is repeatedly executed for each frame of the observation speech (No in step 108). The process ends when the last frame is reached (Yes in step 108).

As has been described above, with CW-MMSE, each band influences the result of MMSE estimation, with a degree of contribution in accordance with the level of its confidence. As a result, the output of the front-end is optimized.

The first embodiment has been described above. Next, a second embodiment in which the output value is optimized by implementing linear interpolation between a speech modal and observation speech will be described.

CW-INT

If observation speech is equivalent to clean speech, the best thing to do is to output the observation speech without processing it. However, with a model-based approach, even in such a case, a model of clean speech is estimated, and consequently, the output becomes more deteriorated than the clean speech. The second embodiment discloses a technique of solving this problem.

In this section, a technique of implementing linear interpolation between a speech model and observation speech, with a confidence index as a weight, will be described. In the following description, this technique is referred to as CW-INT (Confidence Weighted Interpolation).

In CW-INT, an output value $x_d$ in a band d is given by a linear interpolation function indicated in equation (17) below:

[Eq. 17]

$$\tilde{x}_d = (1.0 - \beta_d) \cdot \hat{x}_d + \beta_d \cdot y_d \quad (17)$$

In equation (17) above, $\hat{x}_d$ indicates a clean speech estimated value in the band d, $\beta_d$ indicates a confidence index given to the band d, $y_d$ indicates an observed value in the band d, and $x_d$ indicates the output value in the band d. The linear interpolation function indicated in equation (17) above is weighted using the confidence index $\beta_d$ as a weight, which takes a value from 0 to 1. The linear interpolation function indicates that, as $\beta_d$ approaches 1, the output value $x_d$ approaches the observed value $y_d$, and, as $\beta_d$ approaches 0, the output value $x_d$ approaches the clean speech estimated value $\hat{x}_d$.

Here, the confidence index of the present invention is generated by normalizing the mel LPW value by an appropriate method, as has been described above. In the case of CW-INT, the confidence index $\beta_d$ in equation (17) above can be generated by the following procedure.

Figure 6:
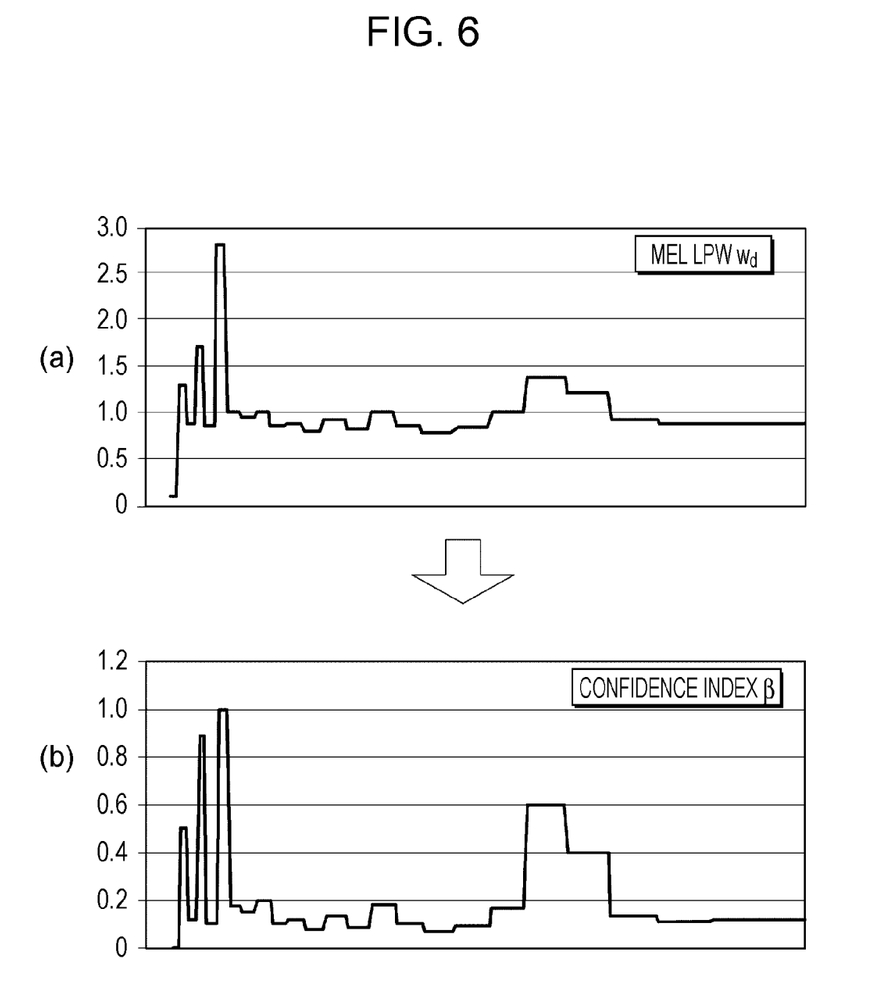
FIG. 6 includes conceptual diagrams illustrating the step of generating a confidence index β from a mel LPW.

FIG. 6(a) illustrates a mel LPW obtained for a frame t. In the case of CW-INT, the mel MPW value $w_d$ is normalized by using an appropriate scaling function so that the value $w_d$ takes a value from 0 to 1 where 1 is the maximum value. An example of the scaling function includes a sigmoid function. Equation (18) below indicates an equation for normalizing the mel LPW value $w_d$ by using a sigmoid function and obtaining the confidence index $\beta_d$:

[Eq. 18]

$$\beta_d = 1.0/(1.0 + \exp(-a \cdot (w_d - 1.0 - b))) \quad (18)$$

Note that, in equation (18) above, a and b are tuning parameters, and appropriate constant values are set.

FIG. 6(b) indicates the confidence index $\beta_d$ generated by the above-described procedure. As illustrated in FIG. 6(b), the confidence index $\beta_d$ is given in each mel band.

When there is a spectral band where the harmonic structure of vowels is remarkable in a frame t of a voiced section, the confidence index $\beta_d$ of a corresponding band d approaches 1. As a result, the output value $x_d$ in the band d, which is the result of linear interpolation indicated in equation (17) above, will become closer to the observed value $y_d$ than to the clean speech estimated value $\hat{x}_d$.

In contrast, when there is a spectral band where the harmonic structure of vowels is lost in the frame t of the voiced section, the confidence index $\beta_d$ of the corresponding band d approaches 0. As a result, the output value $x_d$ in the band d, which is the result of linear interpolation indicated in equation (17) above, will become closer to the clean speech estimated value $\hat{x}_d$ than to the observed value $y_d$.

Figure 7:
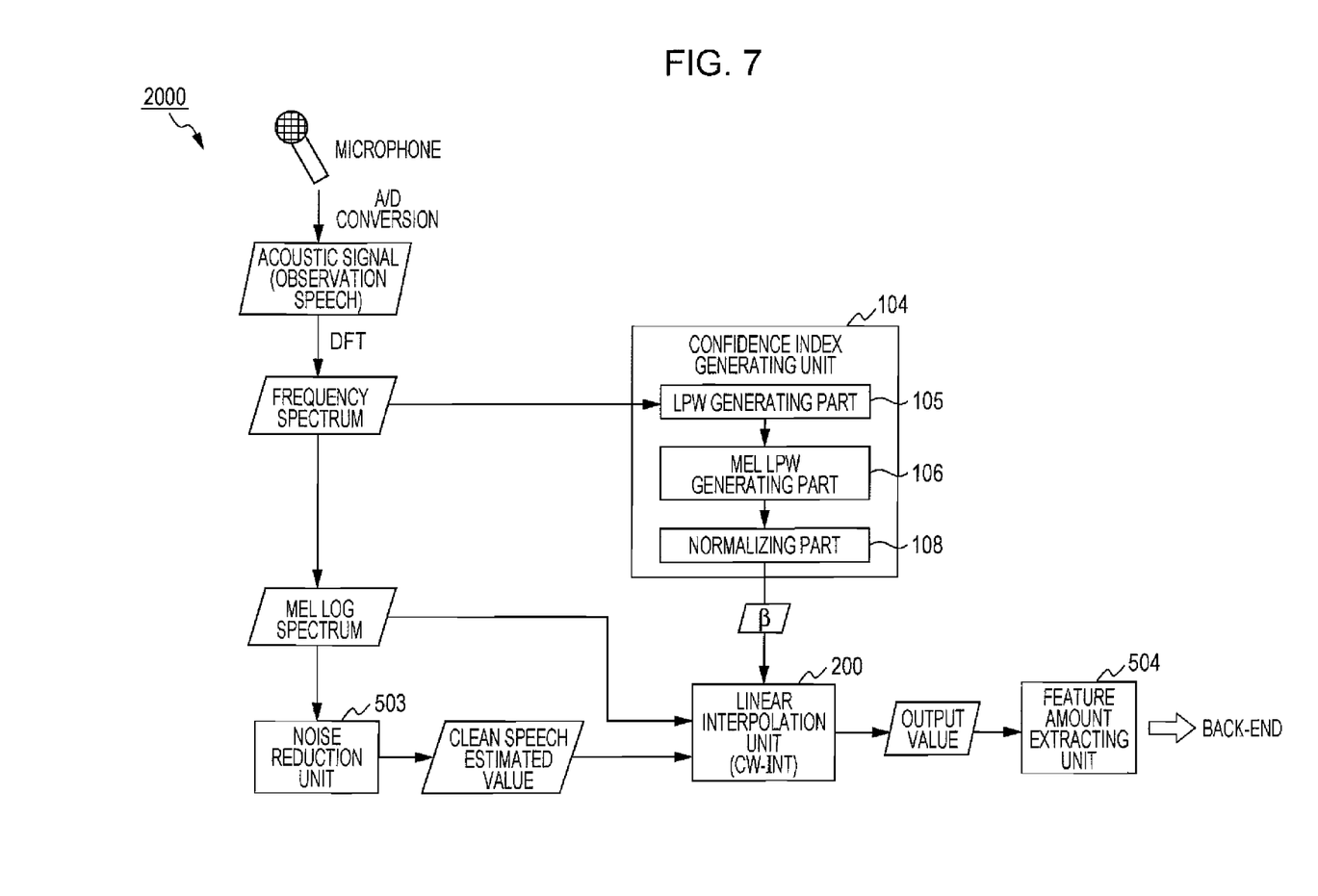
FIG. 7 is a conceptual diagram illustrating the configuration of a front-end in a speech recognition system of a second embodiment.

FIG. 7 conceptually illustrates the configuration of a front-end 2000 in a speech recognition system according to the second embodiment. A noise reduction unit 503 included in the front-end 2000 is a function unit that generates and outputs a clean speech estimated value (vector in the mel log spectrum domain) on the basis of an input of the mel log spectrum for each frame of observation speech. In the case of the second embodiment, the noise reduction unit 503 may adopt model-based noise compensation, as in the noise reduction unit 502 illustrated in FIG. 1, or may adopt a filtering technique, such as a spectral subtraction technique. The front-end 2000 further includes the confidence index generating unit 104 and a linear interpolation unit 200. The confidence index generating unit 104 includes the LPW generating part 105, the mel LPW generating part 106, and a normalizing part 108. Hereinafter, a process executed by the front-end 2000 will be described on the basis of a flowchart illustrated in FIG. 8. Note that, in the following description, reference will be appropriately made to FIG. 7.

Figure 8:
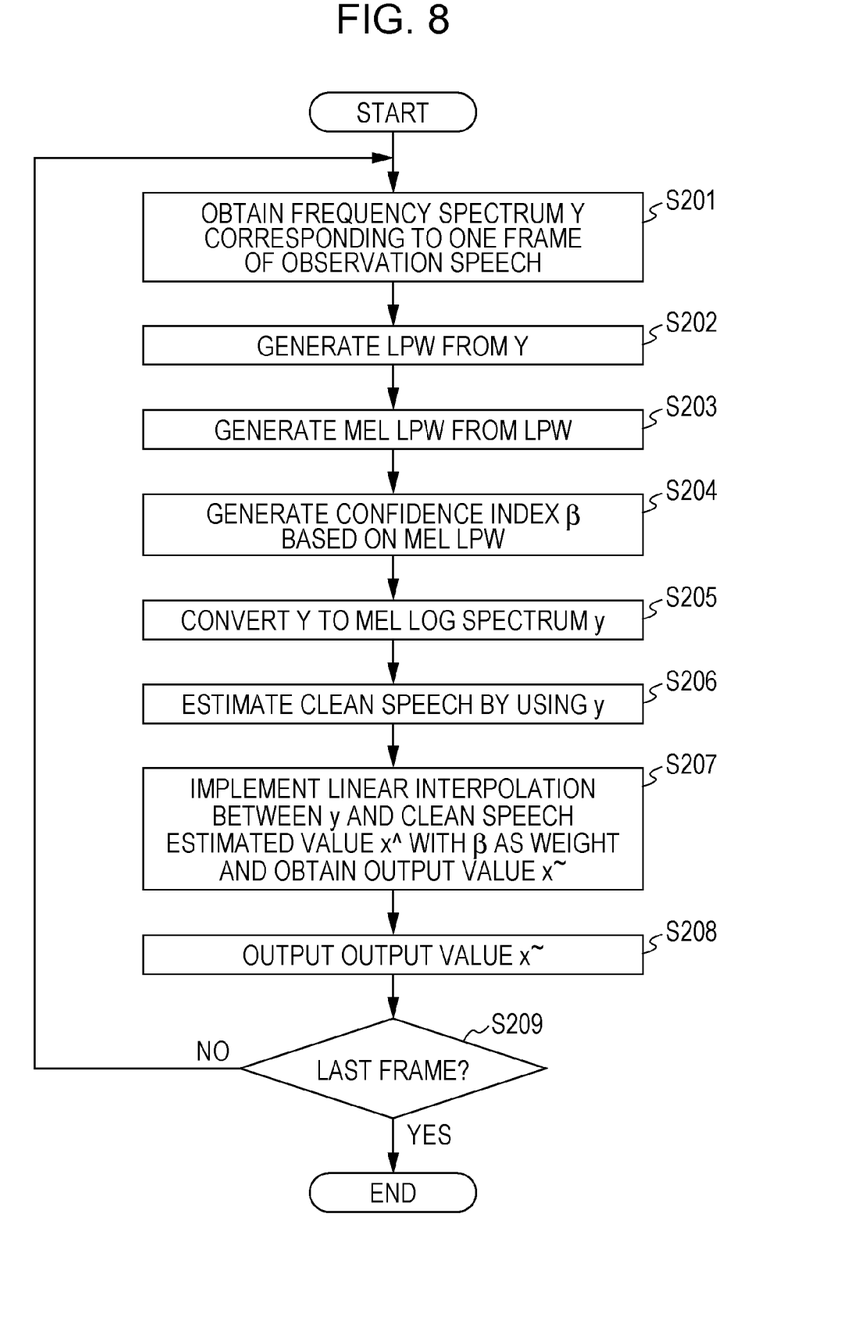
FIG. 8 is a flowchart illustrating a process executed by the front-end of the second embodiment.

Firstly, when the frequency spectrum Y corresponding to one frame of observation speech is obtained (step S201), the LPW generating part 105 extracts the harmonic structure of the frequency spectrum Y and generates an LPW (step S202). Next, the mel LPW generating part 106 generates a mel LPW from the LPW (step S203). The normalizing part 108 normalizes the mel LPW with an appropriate method, and generates a confidence index β (value is from 0 to 1) for each band (step S204).

Thereafter, the frequency spectrum Y corresponding to one frame is converted to a mel log spectrum y (step S205). The converted mel log spectrum y is input to both the linear interpolation unit 200 and the noise reduction unit 503. The noise reduction unit 503 estimates clean speech from the mel log spectrum y by using an appropriate method, and outputs a clean speech estimated value $\hat{x}$ to the linear interpolation unit 200 (step S206).

The linear interpolation unit 200 executes, for each band, linear interpolation between the vector of the mel log spectrum y and the clean speech estimated value $\hat{x}$ (vector in the mel log spectrum domain) input from the noise reduction unit 503. At this point, the linear interpolation unit 200 implements linear interpolation with the confidence index β as a weight and derives an output value x (step S207).

The linear interpolation unit 200 outputs the derived output value x to the feature amount extracting unit 504 (step S208). The feature amount extracting unit 504 extracts a certain feature amount from the output value x and sends the feature amount to the back-end. The above-described series of procedures is repeatedly executed for each frame of the observation speech (No in step 209). The process ends when the last frame is reached (Yes in step 209).

As has been described above, with CW-INT, the observed value in each band is reflected in the output value in accordance with the level of its confidence. As a result, the output of the front-end is optimized.

The second embodiment has been described above. At last, a third embodiment combining the first embodiment and the second embodiment will be described.

CW-MMSE+CW-INT

In this section, a technique combining CW-MMSE and CW-INT, which have been described so far, will be described. In the following description, this technique is referred to as CW-MMSE+CW-INT.

Figure 9:
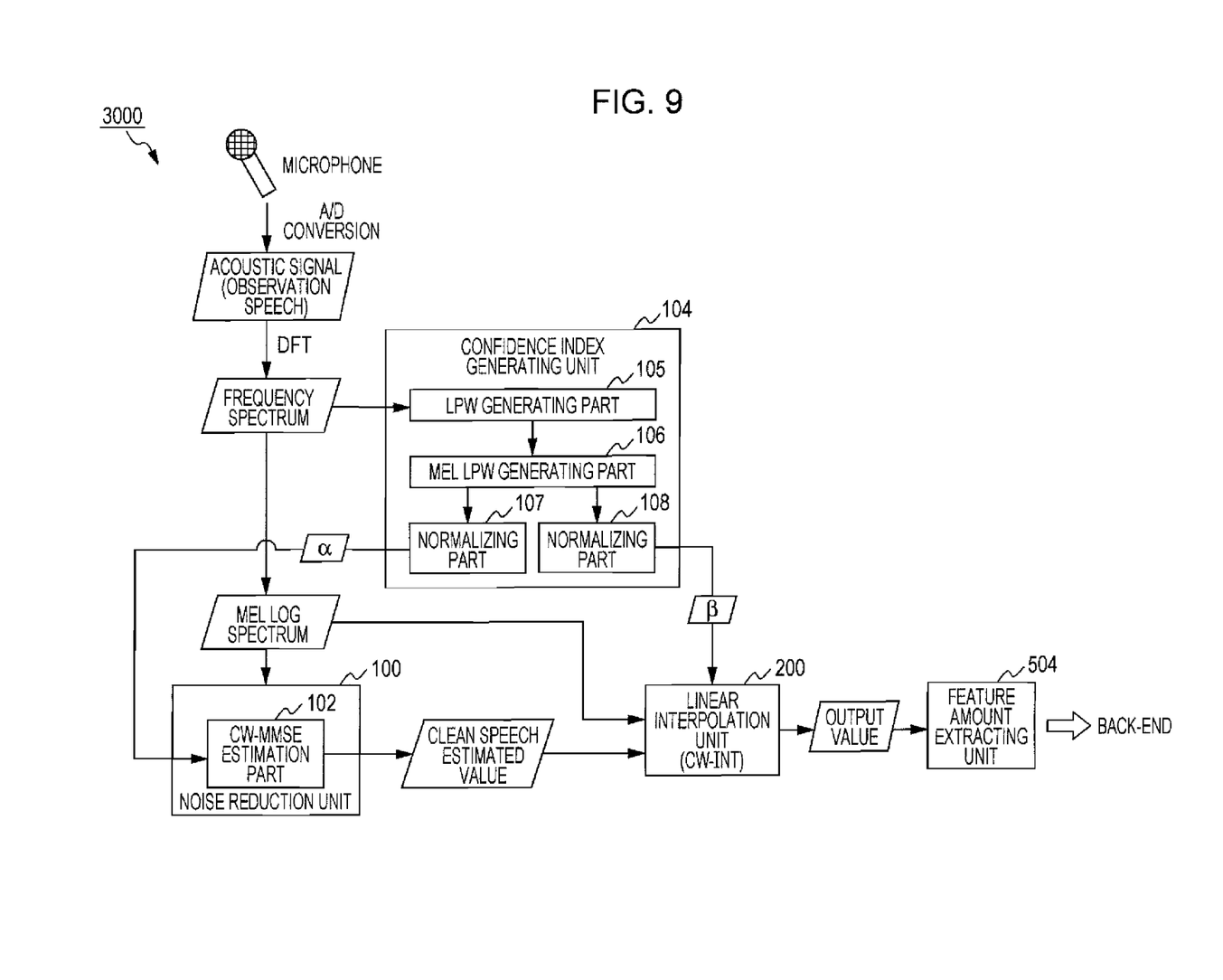
FIG. 9 is a conceptual diagram illustrating the configuration of a front-end in a speech recognition system of a third embodiment.

FIG. 9 conceptually illustrates the configuration of a front-end 3000 in a speech recognition system according to the third embodiment. The front-end 3000 includes the noise reduction unit 100 including the CW-MMSE estimation part 102, the linear interpolation unit 200 (CW-INT), the LPW generating part 105, the confidence index generating unit 104, and the mel LPW generating part 106. Hereinafter, a process executed by the front-end 3000 will be described on the basis of a flowchart illustrated in FIG. 10. Note that, in the following description, reference will be appropriately made to FIG. 9.

Figure 10:
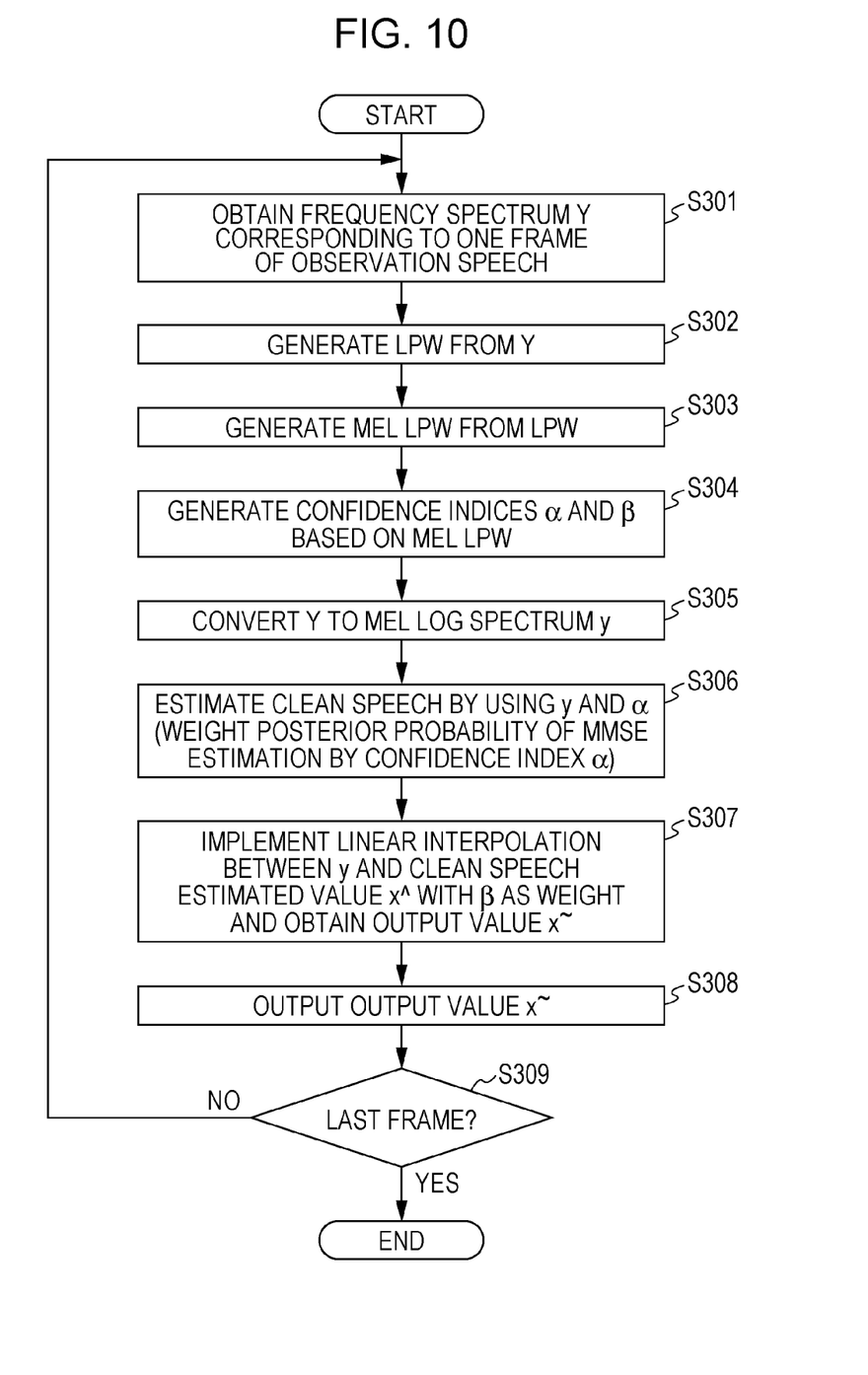
FIG. 10 is a flowchart illustrating a process executed by the front-end of the third embodiment.

Firstly, when the frequency spectrum Y corresponding to one frame of observation speech is obtained (step S301), the LPW generating part 105 extracts the harmonic structure of the frequency spectrum Y and generates an LPW (step S302). Next, the mel LPW generating part 106 generates a mel LPW from the LPW (step S303). The normalizing part 107 normalizes the mel LPW with an appropriate method, and generates a confidence index α (the mean of values is 1) for each band. At the same time, the normalizing part 108 normalizes the mel LPW, and generates a confidence index β (value is from 0 to 1) for each band (step S304). The confidence index generating unit 104 provides the generated confidence index α and confidence index β to the CW-MMSE estimation part 102 in the noise reduction unit 100 and the linear interpolation unit 200 (CW-INT), respectively.

Thereafter, the frequency spectrum Y corresponding to one frame is converted to a mel log spectrum y (step S305). The converted mel log spectrum y is input to both the linear interpolation unit 200 and the noise reduction unit 100. The noise reduction unit 100 estimates clean speech by using the input mel log spectrum y and the confidence index α provided from the confidence index generating unit 104. At this time, the CW-MMSE estimation part 102 estimates clean speech by weighting the posterior probability of MMSE estimation using the confidence index α as a weight (step S306), and outputs a clean speech estimated value x̂ to the linear interpolation unit 200.

The linear interpolation unit 200 executes, for each band, linear interpolation between the vector of the mel log spectrum y and the clean speech estimated value x̂ (vector in the mel log spectrum domain) input from the noise reduction unit 100 (step S307). At this point, the linear interpolation unit 200 implements linear interpolation with the confidence index β as a weight and derives an output value x.

The linear interpolation unit 200 outputs the derived output value x to the feature amount extracting unit 504 (step S308). The feature amount extracting unit 504 extracts a certain feature amount from the output value x and sends the feature amount to the back-end. The above-described series of procedures is repeatedly executed for each frame of the observation speech (No in step 309). The process ends when the last frame is reached (Yes in step 309).

As has been described above, with CW-MMSE+CW-INT, the estimated value of MMSE is optimized, and further, optimal interpolation is implemented between the estimated value and the observed value. As a result, the output of the front-end is optimized.

The present invention has been described with reference to the embodiments. However, the present invention is not limited to the above-described embodiments, and changes are included within the scope of the present invention as long as they have operations and advantageous effects of the present invention within the scope of an embodiment conceivable by those skilled in the art.

The functions of the above-described embodiments can be realized with a program product that is written in an object-oriented programming language such as C, C++, C#, or Java (registered trademark) and that is executable on an apparatus. The program product of the embodiments can be stored in an apparatus-readable recording medium, such as a hard disk drive, a CD-ROM, an MO, a DVD, a flexible disk, an EEPROM, or an EPROM, for distribution. Alternatively, the program product can be transferred via a network in an apparatus-readable format.

Hereinafter, the present invention will be more specifically described using an example. However, the present invention is not limited to the example described below.

Three types of computer program products (CW-MMSE, CW-INT, and CW-MMSE+CW-INT) were generated to cause a computer to execute methods of the present invention disclosed above, and the performance of each computer program product was evaluated using an in-vehicle speech recognition evaluation framework provided by Information Processing Society of Japan (IPSJ).

AN experiment was conducted using the in-vehicle speech recognition evaluation database CENSREC-3. An evaluation condition was Condition 3 that uses a remote microphone for both learning data and test data. A front-end that outputs various feature amounts necessary for the experiment was prepared and was applied to both the learning data and the test data. The feature amounts were in 39 dimensions including MFCC 12 dimensions+ΔMFCC 12 dimensions+ΔΔMFCC 12 dimensions+C0+ΔC0+ΔΔC0, and CMN in units of utterances was applied. The configuration of a back-end, such as the method of generating an acoustic model, was unchanged (Category 0).

A GMM of clean speech was learned using data collected and recorded with a close-talking microphone when the vehicle was idle. Feature amounts of the mel log spectrum in 24 dimensions were used, and the number of mixtures was 256.

Table 1 below collectively indicates the word correct accuracy (%) of the three example program products (CW-MMSE, CW-INT, and CW-MMSE+CW-INT) and a comparative example program product (standard MMSE: MMSE of Segra). Note that "CENSREC-3 Baseline" is a baseline where no speech enhancement or noise reduction is performed.

On the basis of the all-environment mean of the word correct accuracy (%) indicated in Table 1 above, the error reduction rate (%) with reference to the standard MMSE, which is a comparative example, was calculated using equation (19) below:

[Eq. 19]

$$\text{Error reduction rate (\%)} = \frac{\text{Correct accuracy rate (\%) of example} - \text{Correct accuracy rate (\%) of standard } MMSE}{100 - \text{Correct accuracy rate (\%) of standard } MMSE} \times 100 \quad (19)$$

TABLE 1

| Recording Environment of Evaluation Data | | Word Correct Accuracy (%) | | | | |
| --- | --- | --- | --- | --- | --- | --- |
| Driving Velocity | In-vehicle Environment | CENSREC-3 Baseline | Standard MMSE | CW-MMSE | CW-INT | CW-MMSE + CW-INT |
| Idling | Normal | 100.0 | 100.0 | 99.9 | 99.8 | 99.8 |
|  | Hazard On | 99.4 | 97.9 | 98.0 | 98.2 | 98.3 |
|  | Air Conditioning (Low) | 98.0 | 98.8 | 98.8 | 99.2 | 99.4 |
|  | Air Conditioning (High) | 63.1 | 81.2 | 85.2 | 86.7 | 88.1 |
|  | Open Window | 93.1 | 96.6 | 96.9 | 97.6 | 97.3 |
|  | Mean | 90.7 | 94.9 | 95.8 | 96.3 | 96.6 |
| Low-speed Driving | Normal | 99.8 | 98.7 | 98.9 | 98.8 | 99.1 |
|  | Air Conditioning (Low) | 96.8 | 97.8 | 98.0 | 98.5 | 97.8 |
|  | Air Conditioning (High) | 69.3 | 84.5 | 87.4 | 89.8 | 89.7 |
|  | Open Window | 80.8 | 82.5 | 85.1 | 86.7 | 86.7 |
|  | Mean | 87.5 | 91.7 | 93.0 | 94.0 | 94.0 |
| High-speed Driving | Normal | 98.1 | 97.3 | 97.8 | 98.3 | 98.7 |
|  | Air Conditioning (Low) | 94.8 | 96.2 | 96.9 | 97.2 | 97.8 |
|  | Air Conditioning (High) | 64.8 | 83.8 | 85.4 | 88.7 | 87.4 |
|  | Open Window | 49.0 | 61.5 | 66.2 | 67.3 | 68.8 |
|  | Mean | 78.8 | 86.1 | 87.9 | 89.1 | 89.3 |
| All-environment Mean | | 85.2 | 90.5 | 91.9 | 92.8 | 93.0 |

As a result, the error reduction rates (%) with reference to the standard MMSE were 14.4%, 24.4%, and 26.2% in CW-MMSE, CW-INT, and CW-MMSE+CW-INT, respectively. The results indicate that the methods of the present invention greatly improve the speech recognition accuracy.

Although exemplary embodiments of the present invention have been described herein with reference to the accompanying figures, it is to be understood that the invention is not limited to those precise embodiments, and that various other changes and modifications may be made therein by one skilled in the art without departing from the scope of the appended claims.

The invention claimed is:

1. A noise reduction method comprising:
a step of generating a confidence index for each band based on a spectrum of observation speech by generating a first confidence index and a second confidence index;
a step of estimating a clean speech estimated value by executing MMSE estimation on a probability model of clean speech generated on the basis of the observation speech, and, for each band, weighting posterior probability of the MMSE estimation using the confidence index as a weight, by executing MMSE estimation on a probability model of clean speech generated on the basis of the observation speech, and, for each band, weighting posterior probability of the MMSE estimation using the first confidence index as a weight, and
a step of deriving an output value by executing, for each band, linear interpolation between an observed value of the observation speech and the clean speech estimated value, with the second confidence index serving as a weight, and
wherein the step of generating a first confidence index and a second confidence index includes:
a step of extracting a harmonic structure from the spectrum of the observation speech and normalizing the harmonic structure;
a step of smoothing normalized values on a mel scale;
a step of generating the first confidence index by normalizing the smoothed values so that a mean of the smoothed values becomes 1; and
a step of generating the second confidence index by normalizing the smoothed values from 0 to 1.

2. The method according to claim 1, wherein the confidence index is an index representing remarkableness of a harmonic structure of the observation speech.

3. A noise reduction apparatus comprising:
a confidence index generating unit configured to generate a confidence index for each band on the basis of a spectrum of observation speech by generating a first confidence index and a second confidence index; and
a noise reduction unit configured to estimate a clean speech estimated value by executing MMSE estimation on a probability model of clean speech generated on the basis of the observation speech, and, for each band, to weight posterior probability of the MMSE estimation using the confidence index as a weight by executing MMSE estimation on a probability model of clean speech generated on the basis of the observation speech, and, for each band, weighting posterior probability of the MMSE estimation using the first confidence index as a weight, and
a derivation unit configured to derive an output value by executing, for each band, linear interpolation between an observed value of the observation speech and the clean speech estimated value, with the second confidence index serving as a weight, and
wherein the confidence index generating unit generates a first confidence index and a second confidence index by:
extracting a harmonic structure from the spectrum of the observation speech and normalizing the harmonic structure;
smoothing normalized values on a mel scale;
generating the first confidence index by normalizing the smoothed values so that a mean of the smoothed values becomes 1; and
generating the second confidence index by normalizing the smoothed values from 0 to 1.

4. The apparatus according to claim 3, wherein the confidence index is an index representing remarkableness of a harmonic structure of the observation speech.

\* \* \* \* \*